March 10, 1942.  O. W. HOSKING  2,275,820
PNEUMATIC VALVE
Filed April 11, 1939   4 Sheets-Sheet 1
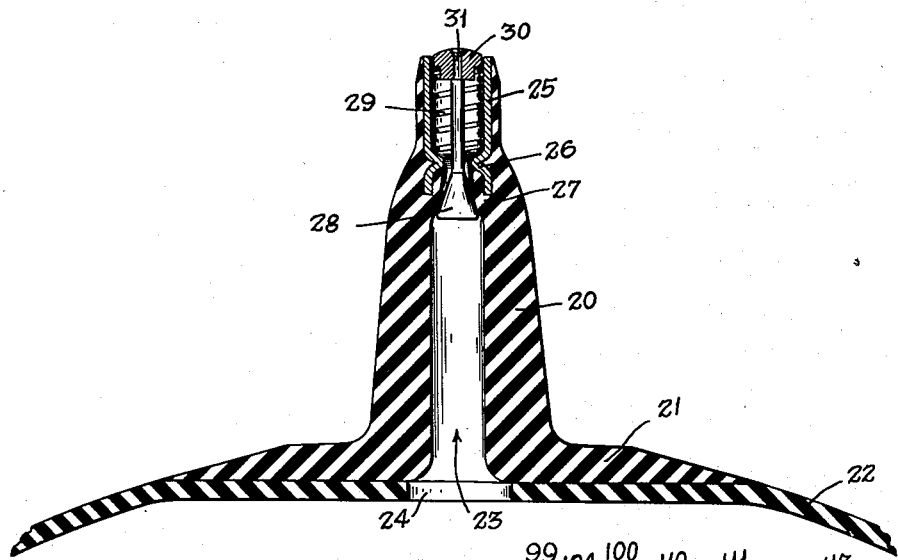
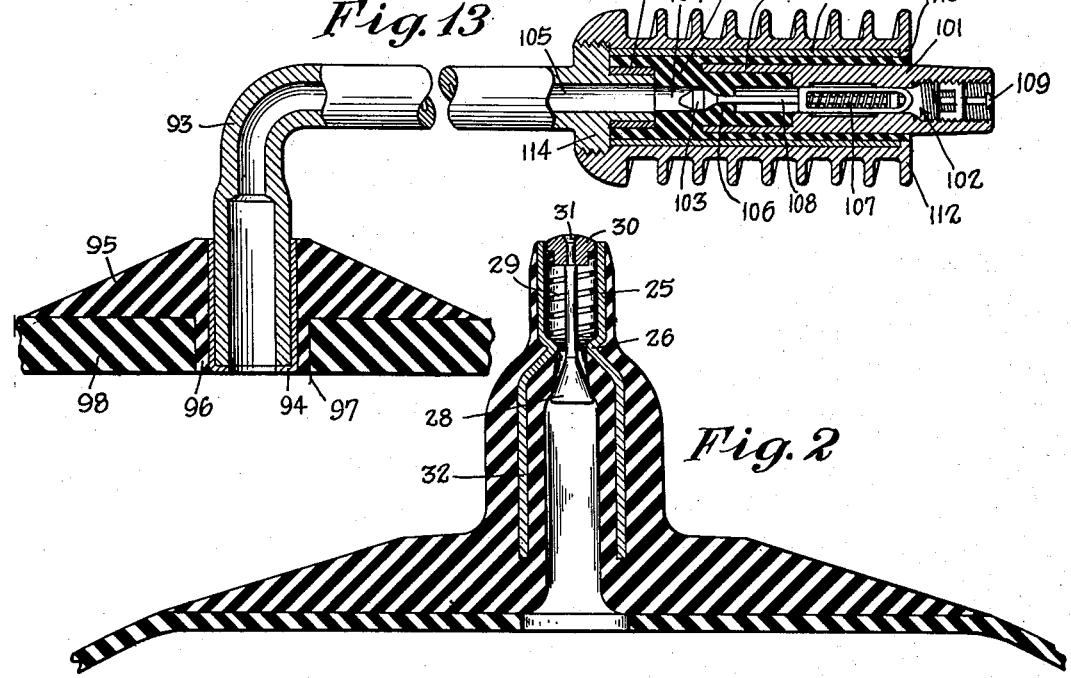
INVENTOR
Oakley W. Hosking
BY
ATTORNEY

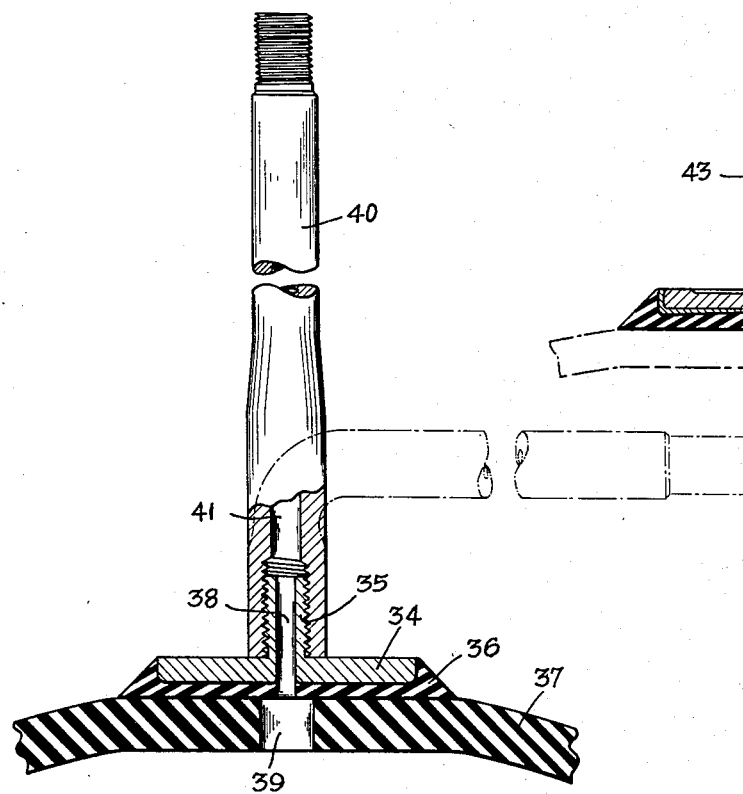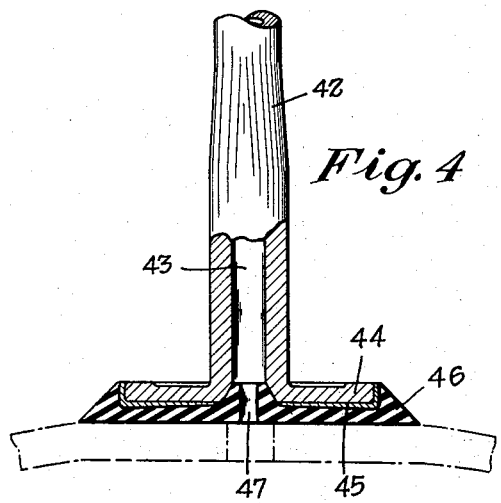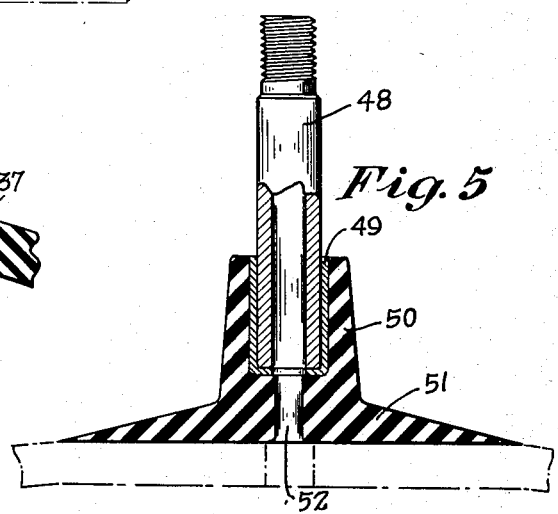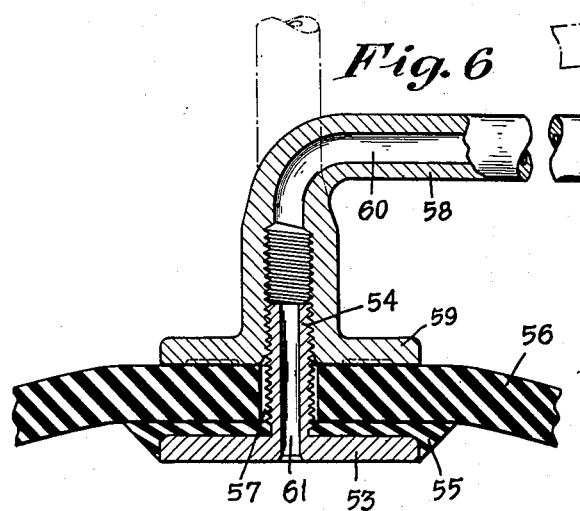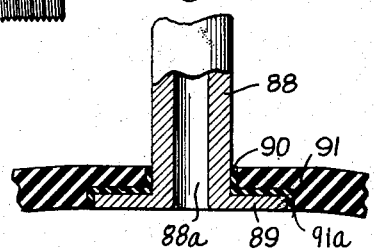

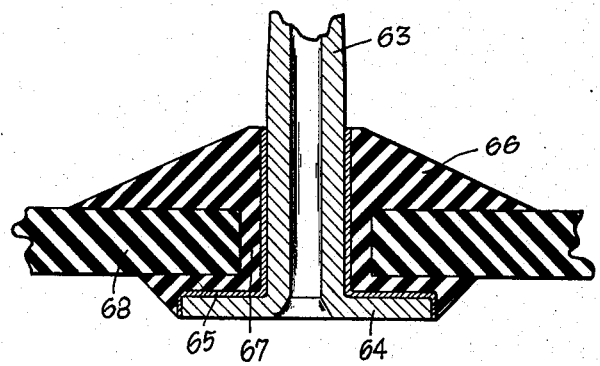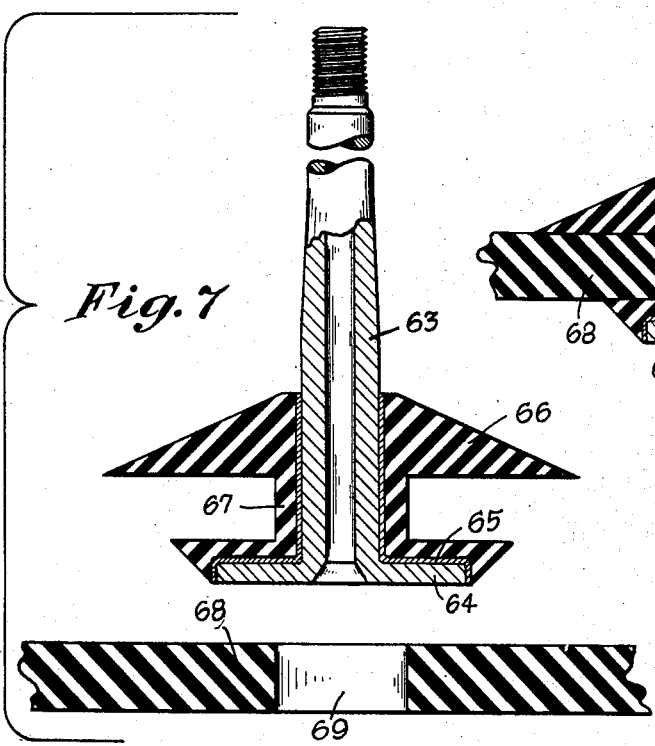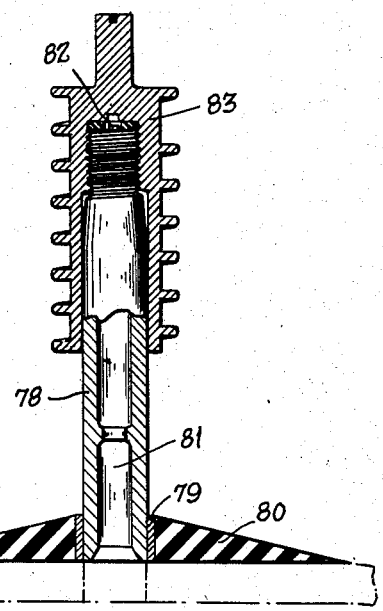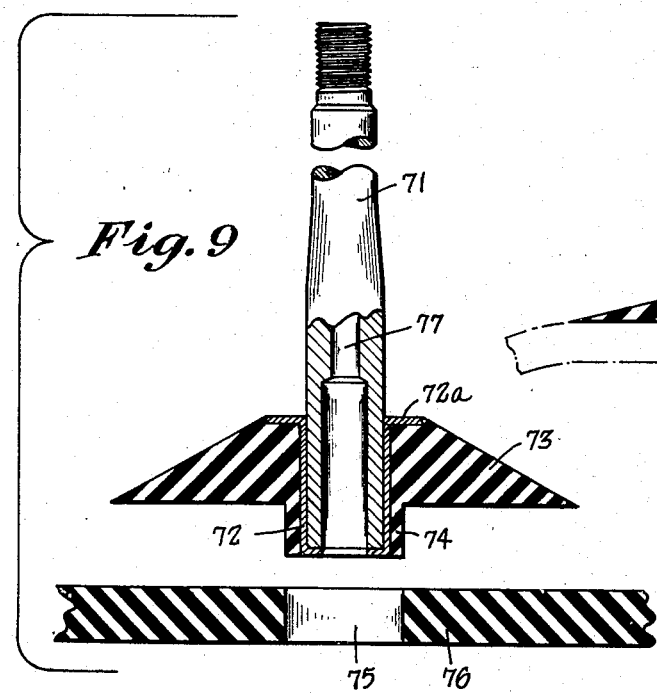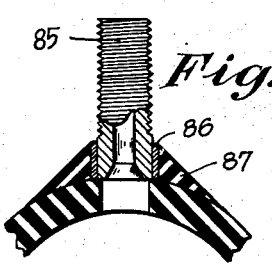

March 10, 1942.  O. W. HOSKING  2,275,820

PNEUMATIC VALVE

Filed April 11, 1939  4 Sheets-Sheet 4

INVENTOR
Oakley W. Hosking
BY
ATTORNEY

Patented Mar. 10, 1942

2,275,820

UNITED STATES PATENT OFFICE 2,275,820

PNEUMATIC VALVE

Oakley W. Hosking, Monroe, N. Y., assignor to Composite Rubber Products Corporation, Bridgeport, Conn., a corporation of Connecticut Application April 11, 1939, Serial No. 267,329

19 Claims. (Cl. 152—429)

This invention relates to inflatable rubber articles and to methods of making the same, and more particularly, it relates to improvements in the mounting of valve stems on the walls of inflatable rubber articles, such as inner tubes for pneumatic tires.

Workers in the art have long been desirous of constructing a valve stem which could be counted on an inflatable body such as a pneumatic tube or tire and which, when mounted, formed an integral part of the tube or tire. A valve stem so mounted would outlive the tire itself, as the most common source of failure in prior valve stem constructions has been due to the difficulty of mounting the valve stem on the tire or the inflatable tube.

To obviate the difficulties heretofore encountered in mounting the valve stem to the tire or tube, there has been devised valve stems comprised wholly of a rubber composition which were mounted on the tire or tube by vulcanizing a rubber pad or foot of the stem to the same. These constructions, although they obviated the mounting difficulties hereinbefore encountered, presented valve failures which had not been founded in the prior constructions where the metal stem was mechanically mounted on the tire or tube.

The proposed devices, which were comprised wholly of rubber, due to the inherent resiliency of the rubber, were not sufficiently rigid to withstand the internal air pressure of the tire or tube which caused the stem to expand and the valve seat constructions of these rubber stems consequently broke down in use.

To obviate the failures which arose through the use of a rubber stem, it was then proposed to mount rigid inserts within the body of rubber making up the stem to reinforce the same and prevent distortion of the rubber under the pressure of the air carried within the tire or tube. These inserts, although they strengthened and reinforced the rubber stems, nevertheless did not wholly eradicate the difficulties, for it was not possible to secure a cohesion between the rubber and the metal components of the stem which would withstand the hard usage to which a tire stem is subjected to in use. These rubber reinforced stems, although they could be integrally secured by vulcanization to the tire or inner tube, nevertheless failed to obviate the difficulties of the rubber stems as the adhesion between the rubber and the metal insert of the stem would fail and allow the inserts to work loose. This failure of the cohesion between the rubber and the metal generally resulted in a subsequent failure of the valve to seat properly and the tire or tube deflated.

I have discovered that rubber may be very securely bonded to metal if the contacting surface of the metal is first given a polished Monel metal surface. The rubber substance which is to be bonded to the metal is brought into direct contact with the polished Monel metal surface, and without the intermediary of any adhesive or cement can be be caused to securely cohere to the treated surface by simply an application of heat and pressure such as is employed to shape and cure rubber articles. This process and its application in general are described and claimed in my copending United States patent applications, Serial No. 234,616, filed October 12, 1938, and Serial No. 410,696, filed September 13, 1941, the latter being a continuation in part of the former.

While "Monel" is a trade-mark, it is used herein in the sense defined by the dictionaries that is as an alloy comprising "approximately 67 per cent of nickel, 28 of copper, and 5 of other elements, chiefly iron and manganese, made by direct reduction from ore in which the constituent metals occur in these proportions." I have found that an alloy having the constituent metals in the percentages mentioned above is most applicable for use in my process.

My process of bonding rubber to metal finds great utility in the tire valve stem industry, for it directly obviates many of the difficulties heretofore encountered. If it is desired to use a metallic valve stem, a portion of the stem may be provided with a surface of polished Monel metal and a suitable base of rubber composition secured thereto by simply applying heat and pressure sufficient to form the rubber composition to the desired shape. The bond secured between the stem and the rubber is as great as the cohesion between the molecules of the rubber, and I have found that the rubber of the base itself will break down before the same can be removed from the stem. The stem may be then secured in position by simply vulcanizing the rubber base to the wall of the tire or tube.

It was found that in some applications a metallic reinforced rubber stem was desirable. My process provides a means for securing the metal reinforcing inserts in position, and the difficulties heretofore mentioned in this type of stem are entirely eliminated.

In this form of the invention the stem is formed with metal reinforcing members having the surface which contacts the rubber of polished Monel metal. The stem is molded or shaped by the application of heat and pressure which also causes the rubber to cohere to the polished Monel metal surface of the reinforcing elements. The stem during the molding operation is generally formed with an integral foot or pad of rubber which can be vulcanized to either the internal or exterior surface of the tire or tube.

Other features and advantages will hereinafter appear.

In the accompanying drawings:

Figure 1 is a longitudinal sectional view of one form of the device of the present invention showing the stem mounted on an inflatable tube with the latter broken away.

Fig. 2 is a view similar to Fig. 1, but showing a modified form of the invention.

Fig. 3 is a sectional view, partly in elevation, showing another form of the device of the present invention.

Fig. 4 is a view similar to Fig. 3, but showing a modified form of the invention.

Fig. 5 is still another view similar to Fig. 3, but showing a still further modified form of the invention.

Fig. 6 is a sectional view, partly in elevation, showing a modification of the present invention mounted on the wall of an inflatable tube or tire with a portion of the wall cut away.

Fig. 7 is a sectional view, partly in elevation, showing still another form of the valve stem of the present invention and a portion of the wall of an inflatable tire or tube on which it is to be mounted.

Fig. 8 is a view similar to Fig. 7, but showing the valve stem of Fig. 7 mounted in place on the wall of the inflatable inner tube or tire, a portion of the valve stem in this figure being broken away.

Fig. 9 is a sectional view, partly in elevation, showing a still further modified form of the invention and a portion of the wall of a tube or tire to which it is to be secured.

Fig. 10 shows a view partly in section and partly in elevation of another form of the invention.

Fig. 11 is a view similar to Fig. 10, but showing a form of the invention mounted on the wall of a bicycle tire.

Fig. 12 is a view similar to Fig. 8, but showing a different form of mounting the valve stem on the wall of an inflatable inner tube.

Fig. 13 is a view partly in section and partly in elevation of a valve and valve stem, particularly adapted for use on dual wheeled vehicles.

Figure 14:
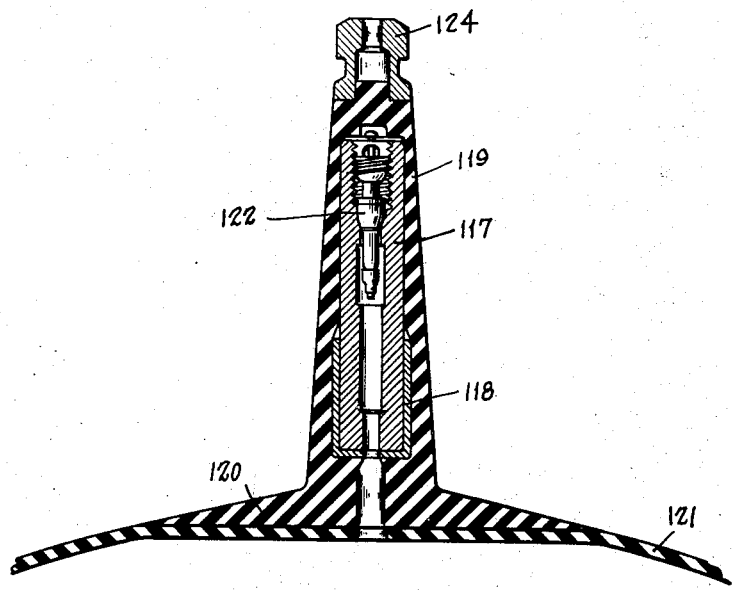
Fig. 14 is a sectional view of a modified form of the invention, showing a removable cap permitting ready access to the valve.

In the form of the invention shown in Fig. 1, a valve stem 20 of yieldable material, such as rubber or rubber composition, is formed with an integral base or foot portion 21 vulcanized to the exterior surface of a tube 22. The valve is provided with a through passage 23 registering with an aperture 24 in the tube. As shown in Fig. 1, the stem is tapered from its base to its tip and presents an exterior surface uninterrupted longitudinally by any protuberances. Preferably, as shown, the stem is provided with a confined band 25 formed with an inwardly projecting annular bead 26 intermediate the ends thereof. The band 25 is formed of Monel metal and the exterior surface thereof, or that portion of the surface which is to contact the rubber stem 20, is preferably given a polished surface.

The stem is formed by a molding process which shapes the stem and also causes the rubber to securely bond to the polished surface of the Monel metal band 25. The band 25 is suitably disposed in a cavity of the mold, together with the rubber composition, and the mold parts brought together under such heat and pressure as ordinarily used to form and cure rubber articles. During this molding operation, the rubber in contact with the polished Monel metal surface reacts therewith and forms a bond therebetween which is stronger than the bond between the molecules of the rubber itself. This bond is a chemical one and not mechanical, as the surface of the Monel metal is clean and polished and presents no surface to interlock with the rubber.

I have previously set out the percentages as given by the leading dictionaries of the English language of the constituent metals of which the alloy, marketed under the trade name of "Monel," is formed. This definition is very similar to the published analysis of "Monel" as given by the exclusive producers thereof, the International Nickel Corporation. The analysis given by the producers of the alloy is as follows:

| | Per cent |
|---|---|
| Nickel | 68 |
| Copper | 29 |
| Iron | 1.6 |
| Manganese | 1.0 |
| Silicon | 0.10 |
| Carbon | 0.15 |
| Sulphur | 0.005 |

Throughout the specification where I mentioned Monel metal, I am referring to the alloy embraced within the definition given by the dictionaries set out hereinbefore.

The upper end of the passage 23, during the molding operation, is formed with a downwardly faced circumferential shoulder 27. A check valve 28 sits upwardly against the shoulder 27 and is normally held thereagainst by a spring 29 having one end seated against a head 30 suitably secured to an end of a valve pin 31 carried by the valve 28. The opposite end of the spring is seated on the bead 26 and retains the valve 28 in its normal position on the seat 27.

The lower portion of the band 25 reinforces the rubber forming the seat 27 and prevents the seat from distorting under pressure of the air confined within the tube 22. The stem 20, being of rubber or the like, is flexible, and, unless the ring reinforces the stem adjacent the valve seat, the valve 28 might attempt to rise by the seat causing the stem to fail.

In larger tires such as those used on trucks and busses where the air pressure within the tube 22 is greater than that found in smaller vehicles such as passenger cars, the ring 25 may be extended downwardly as shown at 32 in Fig. 2. The extension of the band 25, as shown, renders the valve stem less flexible and more securely holds the valve seat against distortion and prevents the valve from being urged passed the seat.

In the form of the invention illustrated in Fig. 3, the stem comprises a base 34 of Monel metal provided with a centrally located threaded boss 35. The side and bottom faces of the base 34 are suitably polished whereupon the base is placed in a mold together with a body of rubber composition which is formed into a pad 36 by an application of heat and pressure sufficient to cure and shape the rubber to the form desired. The rubber composition during the forming operation coacts with the polished Monel metal surface to form a secure and lasting bond therebetween as explained during the description of the embodiment of the invention shown in Fig. 1. The pad 36 of rubber is then so vulcanized to the tube 37 that the passage 38 of the boss is in alignment with an aperture 39 formed in the tube 37. A hollow valve stem 40 having a bore 41 extending therethrough is threaded onto the boss 35 as shown with the bore 41 thereof forming a continuation of the passage 38. The bore 41 of the stem is adapted to take a removable valve core adjacent the upper end thereof. The straight stem as shown in full lines may be used, or, if desired, the curved stem, shown in broken lines in the figure referred to, may be substituted.

In the form of the invention illustrated in Fig. 4, a valve stem 42 having a suitable passage 43 extending therethrough is provided with an integral flange member 44 forming a base or foot. A thin plate 45 of Monel metal is secured to the side or bottom faces of the flange 44 by any suitable means. The exposed surface of the Monel plate 45, before or after the same has been secured to the flange member 44 is polished and the same placed in a mold with a body of rubber in contact therewith. The rubber by heat and pressure is shaped into a pad, shown at 46, which, as has been previously explained, will securely bond to the Monel metal surface of the flange 44 during the molding process. The pad 46 is formed during the molding operation with a passageway 47 in alignment with the passageway 43 of the stem 42. The pad 46 may be vulcanized to the wall of a tube shown in broken lines with the passageway 47 of the pad in alignment with an aperture formed in the wall of the tube.

In Fig. 5, there is illustrated a slightly different form of the invention, the reference character 48 of this figure representing a hollow valve stem having a flange sleeve 49 of Monel metal swaged to an end thereof. The sleeve has a polished exterior surface to which a rubber stem 50 is bonded by a molding operation similar to that described hereinbefore. The stem 50 is formed during the molding operation with an integral flange-like base forming a pad 51 which is to be vulcanized to an inner tube. The pad 51 is formed with a passage 52 in alignment with the bore of the stem 48 which takes, adjacent the upper end, a removable valve core (not shown).

There is shown in Fig. 6, a still further modified stem member which comprises a base 53 of Monel metal provided with a threaded boss 54. The side and upper faces of the base 53 are polished and have secured thereto, by the molding process hereinbefore explained, a pad 55 of rubber or rubber composition. The pad 55 can then be vulcanized to the interior surface of an inner tube 56 with the boss 54 of the base projecting through an aperture 57 formed in the tube 56. The threaded boss 54, in this form of the invention, takes an internally threaded valve stem 58 provided with a flange 59. The stem 58 is threaded onto the boss 54 until the flange 59 is brought into engagement with the exterior surface of the tube 56 thereby clamping the tube between the latter and the base 53. It will be seen that any form of stem might be used, and, there is shown in full lines in Fig. 6, a stem which is given a 90° bend while there is shown in broken lines a fragmentary part of a straight stem. A conventional valve core (not shown) is carried within a passageway 60 of the stem 58, which passageway is in alignment with a bore 61 extending through the boss 54 and the base 53.

A still further modified form of the invention is shown in Fig. 7, wherein there is shown a valve stem 63 provided with an annular flange 64. The lower portion of the stem 63, as well as the top and side faces of the flange 64, are sheathed by a thin Monel plate 65, the outer surface of which is polished. A rubber pad 66 is secured directly to the polished Monel metal surface by the stem and flange by the process explained. The pad 66 is provided with an annular groove 67 which, as shown in Fig. 8, receives the portion of the inner tube 68 adjacent an aperture 69 through which the lower end of the stem is inserted. The rubber pad 66 is then vulcanized to the tube 68 to the end that the stem, pad and tube are formed in an integral structure.

In Fig. 9, there is shown a modified form of the stem, illustrated in Fig. 5. In this form of the invention, a valve stem 71 is provided adjacent the lower end thereof with a Monel metal thimble 72. The thimble 72 is provided with a flange 72a at the upper end thereof and the thimble and lower face of the flange are given a polished exterior surface to which is directly secured, by my molding process, a rubber pad 73 having a depending integral sleeve 74 which is bonded to the lower end of the thimble 72. The sleeve 74 is insertable through an aperture 75 formed in the wall 76 of an inner tube and the pad 73 with the integral sleeve 74 inserted through the aperture 75 is then vulcanized to the wall 76 of the tube. The stem 71 is provided with a passage 77 therethrough which receives any conventional removable valve core (not shown). The upper end of the stem 71 is formed with threads to take a suitable cap if desired. When the tube is disposed within a tire or casing and the same is mounted on a rim, the flange 72a will engage the internal surface of the rim adjacent the aperture through which the stem projects and presents a metal-to-metal engagement. This metal-to-metal engagement prevents any wear of the rubber pad and prolongs the life of the stem.

Fig. 10 illustrates a still further modified form of the invention, wherein a valve stem 78 is provided with a Monel metal sleeve 79 secured to the lower end thereof by any suitable means. The sleeve 79 is provided on the exterior surface thereof with a clean polished surface about which a rubber pad 80 is molded and directly secured thereto by the curing and shaping operation previously referred to during the description of the foregoing embodiments of the present invention. The stem can then be mounted on the wall of an inner tube shown in broken lines by vulcanizing the pad 80 thereto. The stem 78 is formed with a passage 81 adapted to receive a conventional removable valve core, the operating pin of which is shown at 82. The upper end of the stem 78 is provided with external threads to take a suitable threaded cap 83 which, as shown, is formed with a series of fins 84. The cap 83 sleeves the upper end of the valve stem and is in heat-conducting relation therewith so that heat generated by the wheel assembly, of which the tube forms a part, will be conducted up the metal stem 78 and then dissipated by the finned cap 83. The valve core, as the heat is radiated away by the cap 83, will not be subject to the excessive heat built up in the ordinary stem and the life thereof will be prolonged. The cap 83 is preferably formed of some suitable heat-conducting metal such as aluminum or an aluminum alloy so that it will readily conduct heat away from the stem.

The cap is formed at the upper end thereof with a suitable gasket of rubber or the like against which seats the tip of the stem 78. As in the conventional valve stem cap, a small recess or channel is formed to receive the end of the operating pin 82 of the valve core.

Fig. 11 illustrates the preferred manner in which a bicycle tire valve stem is mounted on a bicycle tire. In this application of the invention, a short exteriorly threaded valve stem 85 is provided with a Monel metal band or ring 86 sleeving the lower end thereof. The band 86 is given a clean polished exterior surface and has directly bonded thereto a pad 87 of rubber composition. This pad 87 is secured to the polished surface of the Monel metal band by the process which has been hereinbefore described. The stem 85 may be mounted exteriorly of the tire by vulcanizing the pad 87 to the outer wall of the tire, as shown in the figure referred to, or the same may be mounted on the tire by vulcanizing the pad to the internal wall of the tire. The stem, as shown, is provided with a through passage extending from the base to the tip thereof, which passage forms a continuation of an aperture formed in the wall of the tire when the pad 87 is vulcanized thereto.

There is shown in Fig. 12 a modified method of mounting the valve stem on the wall of an inner tube, particularly where the wall of the tube is relatively thick as in the case of large truck tubes. In this form of the invention, the valve stem 88 is formed with an annular flange 89 projecting laterally at the base thereof. The lower portion of the stem 88 and the top and side faces of the flange 89 to which a mass of rubber is bonded constitute a Monel metal surface.

In the form of the invention as shown, the stem and flange are formed wholly of Monel metal and the lower portion of the stem and top and side faces of the flange are polished and have bonded thereto, by the forming and curing operation heretofore described, a thin rubber coating 90. The valve stem 88 is mounted on the inner wall 91 of the tube with the stem projecting through a suitable aperture formed in the same and is secured in place by vulcanizing the rubber coated portions of the stem and flange to the interior wall of the tube. The interior wall of the tube, as shown, is preferably provided with a seat 91a circumscribing the aperture through which the stem projects to receive the rubber coated flange 89. This permits the interior wall of the tube to be free of any protuberances as the lower face of the flange, in the construction shown, is flush with the interior wall of the tube. It will be apparent, however, that the seat may be dispensed with and the stem illustrated secured to the inner wall of the tube as is the stem shown in Fig. 6.

The stem 88 is provided with a longitudinal passage 88a extending therethrough which is adapted to take a conventional removable valve core adjacent the tip end thereof which has been broken away for convenience in illustrating this embodiment of the invention.

Fig. 13 illustrates a modified form of the invention, as shown in Fig. 9. In this form of the invention, the stem 93 is provided adjacent the end thereof with a flanged Monel metal sleeve 94 having a clean polished exterior surface. A rubber pad 95 is shaped by the molding operation and directly secured to the Monel metal sleeve. The pad 95 has an integral sleeve 96 which is adapted to be inserted through an aperture 97 in the wall 98 of the tube. The pad 95 and its integral sleeve 96, after the latter has been disposed in the aperture 97, are vulcanized to the wall 98 of the tube.

The form of the invention, illustrated by the figure referred to, is adapted for use particularly on large trucks or busses where a dual wheel assembly is employed. To facilitate the servicing of the tire, the stem 93 is provided with a 90° bend which projects the end of the stem 93 in a position which is more accessible than if the stem 93 was straight. The free end of the stem 93 is provided with a Monel metal band or ring 99 having a clean polished exterior surface to which is secured a sleeve 100 of rubber composition. The sleeve 100 is bonded to the polished surface of the band 99 by a similar operation as that used to secure the rubber to the Monel metal of the previously described forms of the present invention. The sleeve is provided with an enlarged bore adjacent the outward end thereof which receives a Monel metal tubular insert 101. The exterior surface of the insert 101 is preferably polished and is directly secured to the interior walls of the rubber sleeve 100 at the time the rubber sleeve 100 is secured to the band 99. A suitable valve 102 is removably carried by the insert 101 and comprises a valve 103 disposed within a passage 104 in alignment with a passage 105 of the valve stem 93. The passageway 104 is provided with a restricted portion forming a valve seat 106 against which the valve 103 is held by means of a spring 107. The valve 103 carries a stem 108 terminating adjacent the end of the insert 101 in a head 109 which permits the valve to be moved away from its seat 106 when the stem 108 is moved against the action of the spring 107. The insert 101 is provided with a skirt-like flange 110, completely embedded within the sleeve 100, reinforcing the same and preventing distortion of the valve seat 106 by pressure exerted against the valve 103.

To further reinforce the rubber sleeve 100 and prevent the same from expanding under the air pressure within the tire, a tube 111 coextensive with the sleeve 110 is disposed about the same.

To prevent the metallic stem 93 from conducting heat from the wheel assembly to the rubber sleeve 100 within which the valve seat 106 is formed, a finned heat-conducting member 112 sleeves the tube 111. The heat-conducting member is provided with an annular inwardly disposed flange 113 engaging the forward end of the tube 111 and is provided with screw threads at the rear thereof for engagement with a threaded collar 114 formed on the stem 93. The heat-conducting member, when threaded on the stem, is supported thereby and retains the tube 111 in place.

It will be seen that heat conducted by the stem 93 from the wheel assembly will be dissipated by the finned member 112 which is preferably formed of heat-conducting material such as aluminum or the like. The body of rubber forming the sleeve 100, within which the valve seat 106 is formed, as it is not subjected to the heat generated by the wheel assembled, will retain its resiliency and not break down in use.

The free end of the insert 101, as shown, is tapered and free of threads. If a cap is to be used, the free end may be threaded to take a suitable cap. There is shown in Fig. 14, a modified form of valve stem 117 having a flanged Monel metal sleeve 118 secured at the lower end thereof. This form of the invention is constructed by placing the stem 117 with the Monel metal sleeve 118 secured thereto in a mold together with the rubber composition and applying heat and pressure. The rubber is formed or shaped, during this molding operation, into the enclosing sleeve 119 and the foot or pad 120 which is to be vulcanized to the wall 121 of the inflatable inner tube. The rubber composition forming the enclosing sleeve 119, which is in contact with the polished surface of the Monel metal sleeve, will be caused to cohere to the same during the molding operation but will not cohere to the surface of the stem 117 which is formed of brass or the like, no pretreatment of the said brass surface for rendering it suitable for the bonding of rubber thereto being contemplated.

The pad 120, during the molding step, is provided with a passage forming a continuation of the bore of the stem 117 and when the pad is vulcanized to the wall of the tube, this passage is placed in alignment with an aperture formed in the wall of the tube. A suitable removable valve 122 is carried within the bore of the stem adjacent the upper end thereof permitting access to the same when it is desired to service the tire.

It will now be seen that the enclosing sleeve 119 forms a cap for the valve stem and will prevent the entry of foreign matter such as dust or the like into the bore of the same. To permit the valve 122 to be accessible, an aperture 123 is formed in the enclosing sleeve 119 during the molding operation by a suitable insert carried by the mold. The upper portion of the sleeve 119, as it is not bonded to the stem, may be pulled upward and elongated sufficiently to displace the aperture from its normal position as shown in Fig. 15 to one where the upper end of the valve stem 117 will project through the aperture as shown in Fig. 16 when the upper end of the enclosing sleeve is moved laterally and downwardly of the same.

To facilitate the elongation of the enclosing sleeve 119, a knob or handle 124, during the molding operation, is secured to the upper end thereof. The handle or knob 124 preferably is knurled as shown in Figs. 15 and 16, and is constructed of Monel metal so as to insure a strong bond between the same and the rubber forming the extremity of the enclosing sleeve.

It will be seen that when it is desired to service the tire, as, for example, when additional air is to be added, it is merely necessary to grasp the handle or knob 124 and pull the same upward until the enclosing sleeve has elongated sufficiently to allow the upper end of the stem 117 to project through the aperture 123 when the handle is moved laterally of the upper end of the stem. This completely exposes the upper end of the stem 117 and allows ready access to the valve 122 for the purpose of replacing the same or servicing the tire.

Figure 15:
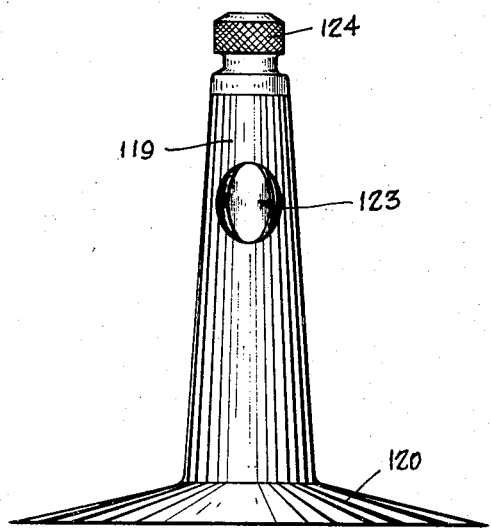
Fig. 15 is an elevational view of the form of the invention illustrated in Fig. 13.
Figure 16:
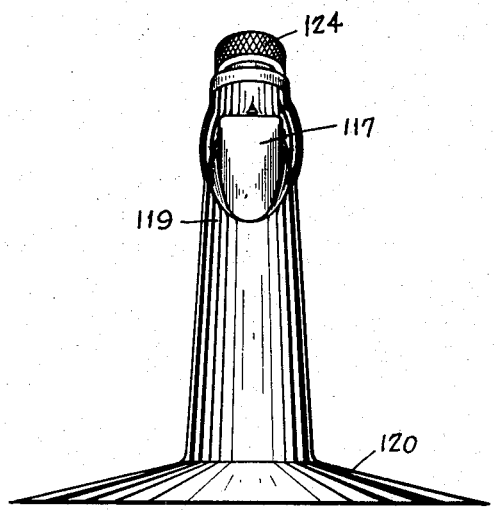
Fig. 16 is a view similar to Fig. 14, but showing the cap partially removed from the stem.

When it is desired to return the cap formed by the enclosing sleeve 119 to its normal position, the knob or handle 124 may be again grasped and the knob or handle moved to a position directly over the upper end of the stem 117, whereupon it may be released and the resiliency of the rubber of the enclosing sleeve will return the same to its normal position, as shown in Figs. 14 and 15.

In some forms of the invention herein described where the Monel metal is not actually embedded in the rubber, the rubber body which is vulcanized to the tire or tube may be preformed and then subsequently bonded to the Monel metal surface of the stem, but, preferably, the rubber body is bonded to the metal during the molding operation which forms and shapes it. Thus, it will be seen that the rubber body may be shaped and bonded to the Monel metal surface of the stem in a single operation.

The stem is preferably mounted on the wall of the inner tube after the same has been partially formed and cured as are most of the conventional stems used today. The rubber pad formed at the base of the stem is secured to the wall of the tube by means of a vulcanizable cement, and then is vulcanized to the wall of the tube at the same time the tube is finally shaped and cured.

Where the stem is to replace another stem, which, for some reason, has failed in use, the old stem is removed by any means convenient and the rubber pad of the stem of the present invention vulcanized in place on the wall of the tube in the same manner as a repair patch is secured and vulcanized in place on a tube.

It will be seen that the present invention has completely obviated the difficulties hereinbefore encountered, for, according to one form of the invention herein disclosed, a metallic valve stem may be permanently and integrally made a part of the rubber tire or inflatable tube.

According to another form of the invention, if it is desired to incorporate with the tire or tube a rubber stem, the same can be quickly and easily done, and, as the bond between the rubber and metallic parts of the stem is as strong as the cohesion between the molecules of the rubber forming the body of the stem, the stem will not fail in use and will outlive the life of the tire or tube.

Throughout the specification where I have mentioned rubber, rubber composition or rubber-like substance, I intend to include all caoutchouc, derivatives thereof and substitutes therefor which are vulcanizable.

Variations and modifications may be made within the scope of the appended claims and portions of the improvements may be used without others.

I claim:

1. In an inflatable body comprising a wall of rubber composition, an elongate tube having a clean polished Monel metal surface on its exterior, at least for a part of its length adjacent one end, and a flange of rubber composition bonded directly to said surface and vulcanized to the wall of said body.

2. A valve stem comprising an elongated hollow member having on at least a portion of the exterior thereof a polished Monel metal surface with a vulcanized rubber body cohering directly to said surface.

3. In a valve stem for use in connection with inflatable rubber bodies, an elongate metallic tube having on the exterior, adjacent one end thereof, a clean polished Monel metal surface; and a pad of rubber composition cohering directly to said surface, said pad having an exterior surface, shaped to engage the outer wall of an inflatable rubber body, and vulcanizable thereto for securing the stem to said body.

4. A valve stem comprising an elongated hollow member having a polished Monel metal surface on its exterior, at least for a part of its length adjacent one end; and a vulcanized rubber pad cohering directly to said surface, said pad lying in a plane substantially perpendicular to said hollow member and presenting a plane surface at the lower end of said stem vulcanizable to the rubber wall of an inflatable rubber body.

5. A valve stem for use with an inner tube comprising an elongated body portion provided with a longitudinal passage extending from base to tip; a flange forming a base for said body portion, at least one face of said flange having a polished Monel metal surface; and a rubber pad cohering directly to said face and forming a surface which can be vulcanized to a wall of the inner tube.

6. A valve stem for use with an inner tube comprising a hollow tubular structure, a base flange of Monel metal provided with a polished surface at one end of said tubular structure; and a flange of rubber composition vulcanized directly to said base flange, said rubber flange having a surface for engaging a wall of said inner tube and vulcanizable thereto for securing said stem to the inner tube.

7. In an inner tube comprising a wall of relatively flexible and elastic rubber composition, a metal valve stem having an enlarged head at its base, said head having a polished Monel metal surface; and a flange of rubber composition vulcanized directly to said head, said stem being mounted on the tube by vulcanizing said flange of rubber composition to the wall thereof.

8. In an inflatable body comprising a wall of elastic rubber composition, a valve stem; an integral flange formed at the base thereof, at least a portion of said flange presenting a clean and polished Monel metal surface; and a vulcanized rubber pad cohering directly to said surface, said pad being vulcanized to the wall of said body.

9. A valve stem comprising an elongated metal body portion provided with a longitudinal passage extending from base to tip; and a base formed on said body portion, said base having a polished Monel metal surface with a vulcanized rubber pad cohering directly to said surface.

10. A valve stem comprising a metallic tube having a flange-like base, said base having a polished Monel metal surface with a vulcanized rubber pad cohering directly to said surface for attaching the stem to an inner tube.

11. A valve stem comprising an elongate metal body; a flange integral with said body and providing a base portion therefor; a thin plate of Monel metal secured to at least one face of said flange, said plate having a polished exterior surface; and a pad of rubber substance vulcanized directly to said surface.

12. A valve stem for use with an inflatable rubber body comprising an elongated stem body having on at least a portion of the exterior thereof a polished Monel metal surface; a sleeve of rubber composition vulcanized directly to said surface; and a flange of rubber formed integral with said sleeve, the stem body being secured to said rubber body by vulcanizing the flange to a wall thereof.

13. A valve stem comprising a metallic valve stem body; a sleeve of Monel metal having a polished exterior surface, integrally secured to an end of said body; a sleeve of rubber vulcanized directly to said Monel metal surface; and a flange formed integral with said last-named sleeve for attachment to a wall of an inner tube by vulcanization.

14. A valve stem comprising a tubular member having a polished Monel metal surface on its exterior, at least for a part of its length adjacent one end; and a sleeve of rubber bonded directly to the said Monel metal surface of said member, said sleeve being provided intermediate its ends with an annular groove to receive the defining edges of an aperture formed in the wall of an inner tube of rubber composition, said groove forming flanges at opposite ends of said sleeve adapted to be vulcanized to opposite sides of the tube wall for securing the stem to said tube.

15. A valve stem for use in connection with an inflatable rubber body comprising an elongate hollow metallic member; means for mounting said metallic member on a wall of the inflatable body including a body of rubber composition secured to an end of said hollow member and presenting a surface vulcanizable to a wall of said body; an elongated rubber body secured to the opposite end of said metallic member and forming a continuation thereof, said rubber body provided with a longitudinal passage forming a continuous passage with the bore of the hollow metallic member, the passage of said rubber body being restricted contiguous to the adjacent end of said metallic member to provide an annular valve seat in said passage; a movable valve member cooperating with said seat to close said passage; and means for mounting said valve within said rubber body including means for reinforcing said rubber body and preventing distortion of the valve seat forming the same, said means including a tubular Monel metal member having a polished exterior surface bonded directly to the walls of the passage of the rubber body and having an integral skirt depending therefrom, said skirt being completely embedded within said rubber body and circumscribing the seat formed within the same.

16. A valve stem as defined in claim 2, wherein said vulcanized rubber body is provided with a bore communicating with the interior of the elongated hollow member to form a passage through the stem, said bore being constricted intermediate its ends to form an annular valve seat in the passage, and wherein said hollow elongated body comprises a skirt portion entirely confined by and reinforcing said vulcanized rubber body, and preventing material distortion of the said annular rubber valve seat.

17. A valve stem as defined in claim 2, wherein said vulcanized rubber body is provided with a bore communicating with the interior of the elongated hollow member to form a passage through the stem, said bore being constricted intermediate its ends to form an annular valve seat in the passage, and wherein said elongated hollow member is entirely covered circumferentially by the rubber of said vulcanized rubber body, said elongated hollow member reinforcing the rubber body and preventing material distortion of the constricted portion of the rubber bore forming said rubber valve seat.

18. In a valve stem as defined in claim 3, a heat-conducting member sleeving the end of said elongate metallic tube opposite the end to which said rubber pad is secured, said member being in good heat-conducting relation with the elongate metallic tube and being provided with a finned outer surface for dissipating heat away from said metallic tube.

19. In a valve stem as defined in claim 15, a heat-conducting member sleeving said elongate, rubber, valve-seat-containing body and surrounding the Monel metal skirt embedded therein, said member being in good heat-conducting relation with the hollow metal member and being provided with a finned outer surface for dissipating heat away from the integral valve seat of said elongate rubber body.

OAKLEY W. HOSKING.